3,281,393
PHENYLENE OXIDE POLYMERS SUBSTITUTED WITH EPOXIDIZED ALKENYL GROUPS
Kwan C. Tsou and Howard E. Hoyt, Huntingdon Valley, and Benjamin David Halpern, Jenkintown, Pa., assignors to The Borden Company, New York, N.Y., a corporation of New Jersey
No Drawing. Filed Dec. 28, 1962, Ser. No. 247,856
8 Claims. (Cl. 260—47)

This invention relates to copolymers of dialkyl phenylene oxide and alkyl alkenyl phenylene oxide and the process of making them.

The products of the invention are formed by copolymerization of monomers of the formulas

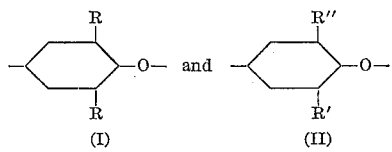

in which R represents any $C_1$–$C_3$ alkyl group, i.e., methyl, ethyl or propyl; R' is a $C_3$–$C_5$ alkenyl such as allyl, methallyl or ethallyl; and R'' is equal to either R or R'.

The copolymer includes such units as

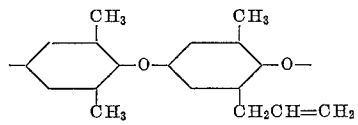

There has been made heretofore homopolymers of the 2,6-disubstituted 1,4-polyphenxylene oxides in which R, R' and R'' have been alkyls or R' and one R at least have been alkenyl groups. When R, R' and R'' have all been alkyls, the polymer has been thermoplastic. When alkenyl groups appear in both nuclei, as at R' and one R, then the speed of setting has been so rapid at high temperatures such as 250°–600° F., at which our compounds are designed to be useful, as to shorten objectionably the pot life of the adhesive at such temperatures of use or to interfere, for some purposes, with proper spreading or shaping of the plastic mass before it cures to firm condition.

Briefly stated the invention comprises the copolymers having the recurring units shown in the formula above, that is, copolymers of alkenyl phenols with alkyl phenols. It comprises also such copolymers in which part or all of the alkenyl groups are transformed to epoxyalkyl groups.

The invention comprises also the herein described process of making the copolymers in which halophenols containing the desired substituents (alkyl and alkenyl groups) in the nuclei are condensed by coupling agents in alkaline medium to form the copolymers which then are cross-linked to thermoset polymers.

We have found that the copolymers made as described have not only the desired controlled curing rate, but also show an abnormally low percentage decrease of tensile strength, as measured at a temperature of 500° F., for instance, from the tensile strength of the material after being cured at said temperature and then tested at room temperature.

The halogen in the halo substituted phenol is ordinarily bromine but may be chlorine or iodine. Thus the monomers with which we start would be a mixture of any di($C_1$–$C_3$ alkyl) halophenol with either dialkenyl or monoalkyl monoalkenyl substituted halophenol, e.g., dimethyl-bromo-phenol with either diallyl- or monoallyl-monomethyl-bromo-phenol.

We ordinarily use such of the isomers of these starting monomers as to give the copolymer with 2-alkyl-6-alkenyl-phenylene oxide. We may select, however, other isomers of the alkenyl phenols and of the exclusively alkyl halophenols that have alkenyl and alkyl groups at other positions, to give corresponding isomers in the final copolymer. It is economical to select as the substituted phenols to be halogenated for use, those which are available commercially as, for instance, the 2,6 or the 2,5 isomers such as 2,6 or the 2,5 xylenol, 2-methyl-5 (or 6)-allyl phenol or others of the class prepared by known methods.

Into the isomer selected, we substitute a bromine or other halogen atom in the nucleus by any usual technique for such halogenation.

The high temperature properties of our product are improved if the halogen, that may remain in small proportion as a terminal element, is removed as completely as possible during the condensation to the oxide. A bromine content of less than 3% is accomplished by conducting the reaction below 10° C. and with strong agitation.

The selected halo substituted phenol monomers are subjected to condensation by an oxidative coupling agent that abstracts an electron under the conditions of condensation. Examples of agents that meet the requirements and illustrate the class to be used are potassium or any other alkali metal or ammonium ferricyanide, lead oxide, cobaltic and cupric chlorides, and iodine. Proportions of the coupling agent are those that are conventional in the class of copolymerization, e.g., 0.02–0.5 equivalent for 1 mole total of monomers.

The alkali used, to form a halide during the condensation, is any usual one such as sodium, potassium, ammonium or quaternary methyl ammonium hydroxide which dissolves in water and provides a substantial concentration of hydroxide ion. The alkali is suitably used in an amount more than stoichiometric.

As to conditions, the initial condensation is effected in an aqueous alkaline suspension. The alkali solution is first charged to the reaction vessel and the two monomeric substituted phenols, suitably predissolved in about 10 times their weight of a water immiscible solvent of which benzene and toluene are examples, are introduced. The whole is then stirred into a dispersion. The air in the vessel is replaced by nitrogen.

Then there are added the potassium ferricyanide or other oxidative coupling agent. The temperature is maintained by cooling, as below 70° C. or below the boiling point of the mixture and suitably below 15° C., so as to increase the molecular weight of the condensate produced and of the final polymers. The mixture is stirred until a test of a benzene extract of the reaction mixture, when mixed with 4 times its volume of methanol, showed precipitation of a flocculent material and the amount of the precipitate (the desired polymer) showed no substantial increase in the amount of precipitate between tests at 5 minute intervals. This requires ordinarily about 5–120 minutes. The polymer so made is then dried, finally in a vacuum for about 10 hours at room temperature.

We have discovered that it is possible to form copolymers by this mechanism from suitable monomeric bromophenols, as for example with

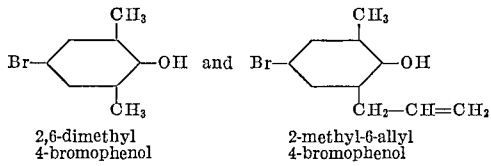

2,6-dimethyl 4-bromophenol (III)

2-methyl-6-allyl 4-bromophenol (IV)

or

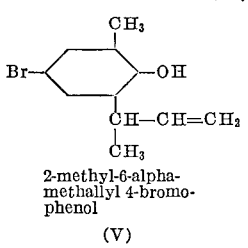

2-methyl-6-alpha-methallyl 4-bromophenol (V)

We have found that the polymerization, by careful control of the purity of monomers and conditions of polymerization, can be carried to substantially complete consumption of the monomers, to give a wide spectrum of copolymers of varying physical properties. These properties are dependent largely on the proportion of unsaturation (ethenoid) groups incorporated into the side chain as demonstrated by Table I of Example 1. Copolymerization presents the advantage of control over the degree and rate of cross linking which ensues in the use of the polymers. Thus, according to our nomenclature, we may prepare copolymers of (I) (dialkyl phenylene oxide) and (II) (alkyl alkenyl phenylene oxide) in which the molar percent of (II) is 10%–90% of the total moles of (I) and (II). Thus we have used 10%, 20%, 50% and 70%, respectively, of (II) to give "copolymer 10," "copolymer 20," "copolymer 50" and "copolymer 70." Yields reached 90% or more of the calculated. The recovered, unreacted monomeric material was in all cases less than 5%, which precludes the possibility that one of the monomers did not react. In the case of copolymer 50, chromatographic fractionation gave seven fractions which differed only in molecular weight and presented almost identical IR spectra, with bands at 6.1 and 11.0 microns, characteristic of the allyl group. Analytical bromination of the side chain of this polymer showed 6.0 meq./gram of addition bromine (calculated 7.52). The fact that the group was converted to epoxide by the action of peracetic acid, as in Example 3 constitutes additional proof of the copolymer.

In making other copolymers described herein there are substituted equimolar amounts of any of the other halophenols with varying substituent alkyl groups and any of the alkenyl groups disclosed in place of the methyl, allyl and alpha methallyl bromophenols in the Formulas III–V above.

The invention will be further illustrated by description in connection with the following specific examples of the practice of it, proportions being expressed here and elsewhere herein as parts by weight except where indicated specifically to the contrary.

EXAMPLE 1

In preparation of said copolymer 50, a 3-liter 3-necked flask cooled in an ice bath was provided with a mechanical stirrer operating at high speed, a nitrogen inlet and outlet, an inside thermometer, and a baffle consisting of a sealed ½ inch glass tube. The flask was charged with:

2,6-dimethyl-4-bromophenol
 (M.P. 75°–79° C.) _____ 50.2 g. (0.25 M).
2-methyl-6-allyl-4-bromophenol
 (pure by chromatography) _____ 56.7 g. (0.25 M).
Sodium hydroxide, 10% aqueous
 solution _____ 500 ml. (1.25 M).
Benzene, tech. _____ 1000 ml.

While being cooled to 5° C. over a period of 40 minutes, the flask was purged with oxygen-free nitrogen. A solution of 16.5 g. potassium ferricyanide (0.05 mole or 0.05 equivalent as an oxidizing agent) in 100 ml. water precooled to 5° C. was added through the nitrogen outlet. The temperature in the flask immediately rose to 10° C. Stirring was continued for 2 hours and the temperature permitted to rise slowly to room temperature. The benzene layer was then separated, washed with 18% aqueous hydrochloric acid and next with water and evaporated to about 10% concentration of polymer. The concentrated solution of polymer was then precipitated by being stirred into 4 volumes of methanol, the precipitated polymer filtered, washed on the filter with methanol, air dried, and finally vacuum dried to constant weight at 35°–40° C. The yield 60 grams or 91% of theory. Acidification of the sodium hydroxide raffinate yielded only 0.25 gram of unconverted phenols.

It was a white, fibrous solid which had a minimum molding temperature of 400° F., intrinsic viscosity 0.293 (benzene) corresponding to a molecular weight of 22,000, and bromine content 1.83%. The polymer was soluble in benzene, chloroform and trichloroethylene. It showed no change in viscosity, molding temperature or solubility after 6 months storage in air. This is one of the respects in which it differs from the allyl containing polyphenylene oxides of Kurian and Price (J. Poly. Sci. 49, page 273) and of Hay (J. Polymer Science 58, page 583, Table III).

By varying the proportions of the methyl allyl bromophenol monomer within the range 10–90 moles for 100 total of it and the dimethyl bromophenol, we have made the copolymers 10–90, the figure showing said proportion selected.

In the experiments on thermosetting time or cure rate of the polymers of this invention, we used the "stroke cure" principle employed in characterizing curable phenolic resins as outlined by d'Allelio in Experimental Plastics, page 165, 1946. Because of the high melting character of the copolymers, a surface temperature of 500° F. was permissible for our measurements. The cure time as given in the table is the time elapsed from that of quick molding of the material by pressure to a thin film on a polished 500° F. surface to the stage when the polymer could no longer be shaped. The controlled curing rate for these products at 500° F. is compared in Table I with that for the conventional control resins tested, the total of groups substituted (in the side chains) of the products being shown as milliequivalents per g. of product.

TABLE I

| Material Tested | Side Chain Double Bonds meq./gram polymers [1] | Ratio Allyl Groups to Methyl Groups at R'[2] | Cure Time Sec. at 500° F. |
|---|---|---|---|
| Control A (prior art) [3] | 0 | None (dimethyl) | 3,600 |
| Control B, Poly-2-methyl-6-allyl-1,4-phenylene oxide (MAP). | 6.7 | 10 per 0 | 3 |
| Copolymer 10 | 0.6 | 1 per 9 | 187 |
| Copolymer 20 | 1.2 | 2 per 8 | 80 |
| Copolymer 50 | 3.0 | 5 per 5 | 38 |
| Copolymer 70 | 4.2 | 7 per 3 | 20 |

[1] By bromination analysis, each 2 bromines added represented as 1 meq. double bond.
[2] Calculated from molar percent of the allyl containing monomers used in the polymer preparation.
[3] Poly 2,6-dimethyl-1,4-phenylene oxide.

Our copolymers 10–90 are very high in average molecular weight (about 26,000 for instance) as compared to the molecular weights of averaging about 15,000 for the homopolymer (MAP) these molecular weights being calculated from intrinsic viscosities of 0.35–0.37 for representative samples of our copolymers and 0.17 for MAP.

EXAMPLE 2

*Polymerization of 2-methyl-4-bromo-6-alpha-methallyl phenol and copolymerization of 2,6-dimethyl-4-bromophenol*

Into a 250 ml. Erlenmeyer flask, equipped and cooled as before, the following are introduced:

2-methyl-4-bromo-6 - (alpha-methallyl) phenol (Formula V) ____ 60.5 g. (0.25 mole).
2,6-dimethyl-4-bromophenol _____ 50.2 g. (0.25 mole).
Benzene _____ 1000 ml.
Sodium hydroxide, 10% aqueous solution _____ 500 ml.

The flask is purged with oxygen-free nitrogen for 40 minutes at 8° C. Lead dioxide (12 g. suspended in 100 ml. benzene) is added through the nitrogen inlet the temperature rising to 10° C. in two minutes. After one hour's stirring under nitrogen, the benzene layer is extracted, washed with an 0.8% solution of hydrogen chloride in water, concentrated by evaporation to 10 ml. and precipitated by being stirred into 40 ml. methanol. The polymer, a fine powder, is washed with methanol and dried to yield 33.4 g. or 49.7% of theory.

The polymer showed alkenyl bands at 6.1 and 11.0 microns in the infrared, contained 2.5% bromine, was moldable at 200° F. and curable in 25 minutes at 500° F. to a stiff thermoset condition. The intrinsic viscosity was 0.121.

EXAMPLE 3

*Epoxy polyphenylene oxides*

The alkylene groups of the polymers and copolymers are peroxidized to give polymers containing the epoxy function and having increased solubility in polar solvents such as acetone and methyl ethyl ketone.

In this case the unit of 2,6 disubstituted polyphenylene oxides containing allyl or other alkenyl group at some of the R″ or R′ positions in the first Formula II above where peroxidized, as with peracetic acid in customary manner, to introduce oxirane rings thus:

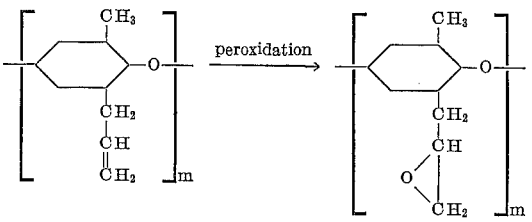

A representative epoxidation was made as follows:

A 250 ml. 3-necked distillation flask, equipped with thermometer, reflux condenser and magnetic stirring bar, was heated in a water bath and magnetically stirred.

Charge to the flask:
Copolymer 50 _____g__ 12
Chloroform _____ml__ 60
Peracetic acid 40% acetic acid 3.0 ml. (0.016 M)

The contents were heated under good agitation for 3 hours at 40°–42.7° C. The resulting solution was then washed well with water, evaporated under reduced pressure at room temperature almost to dryness, dissolved in 75 ml. hot benzene and precipitated in 400 ml. cold methanol. The precipitated polymer was filtered, washed with methanol and dried under vacuum to constant weight at 40° C. The data follow: recovered polymer 11.7 grams; epoxy value 0.72 meq./gram; intrinsic viscosity 0.255, cure time at 500° F. 14 seconds. The polymer was completely soluble at 10% concentration in methyl ethyl ketone. The precursor polymer was 22% soluble at 10% concentration in methyl ethyl ketone. Infrared spectrum showed a reduction in intensity of allyl bands (due to epoxidation) at 6.1 and 11.0 microns.

EXAMPLE 4

*Epoxidation of MAP (polymer of 2-methyl-6-allyl-1,4-phenylene oxide)*

The epoxidation of MAP was carried out by the exact procedure of Example 3.

This peracetic acid epoxidation reaction was carried out ratios of alkenyl to alkyl groups at R′ respectively (cf. formula first given). The alkenyl groups were converted partially to oxirane (epoxy) containing groups. Representative samples were tested for cure rate, some being included with the results presented in Table II below.

TABLE II
[Cure time of epoxidized disubstituted (alkyl alkenyl) phenylene oxides at 500° F.]

| No. | Precursor Polymer | | Epoxy Polymer | | Cure Time Sec. |
|---|---|---|---|---|---|
| | Our Nomenclature | Orig. Side Chain Unsatn., meq/g. (A) | Side Chain Unsatn., meq./g. (B) | Side Chain Epoxy meq./g. (C) | |
| 1 | Copolymer 50 | 3.0 | 2.28 | 0.72 | 14 |
| 2 | Copolymer 50 | 3.0 | 2.10 | 0.90 | 2 |
| 3 | Copolymer 50 | 3.0 | 1.31 | 1.69 | 1 |
| 4 | MAP | 6.71 | 5.93 | 0.78 | 2 |

NOTES:
(A) As analyzed by bromine absorption 2 Br=1 double bond=1 meq./g. of copolymer. The figures 3.0 and 6.71 are the ml. of 2 N bromine solution required to saturate 1 g. of copolymer.
(B) Calculated from (A) and (C).
(C) As analyzed by reaction with HCl in pyridine 1 epoxy=1 meq./g. polymer.

More specifically, the epoxidation of this example, was effected by forming a mixture of the following proportions in the flask equipped and operated as described in Example 3.

Material: Amount
Copolymer 70 _____g__ 12
Chloroform _____ml__ 60
Peracetic acid 3 ml. of 40% solution ____M__ 0.016

The contents are heated with good agitation for 3 hours at about 40°–45° C., the resulting solution washed with water, and the epoxidized polymer separated and processed as described in Example 3.

In modifications of this example, copolymer 10 and copolymer 20 were substituted in the composition, separately and in amounts of 12 g. each, for the copolymer 70 and processs described.

EXAMPLE 5

In this case the 4-bromosubstituted phenol containing a substituted alkenyl group was first epoxidized as described in Example 4. The epoxidized monomer so produced was then copolymerized with the dialkyl substituted bromophenol. The conditions and procedure are then exactly as described in Example 1 except that the epoxidized-alkenyl-bromophenol is substituted on an equimolar basis for the methyl allyl bromophenol of Example 1. A specific illustration of this preparation is the following.

| Components: | Proportions |
|---|---|
| 2,6-dimethyl-4-bromophenol | 50.2 g. (0.25 M). |
| 2-methyl-6-glycidyl-4-bromophenol | 60.7 g. (0.25 M). |
| Sodium hydroxide, 10% aqueous solution | 500 ml. (1.25 M). |
| Benzene, tech. | 1000 ml. |

The materials are charged into the equipment of Example 1 purged with nitrogen, stirred, maintained at a low temperature, and mixed with 0.05 mole of potassium ferricyanide in 100 ml. of water, all as described in Example 1. After 2 hours at a temperature not substantially above 10° C., the temperature is allowed to rise to approximately room temperature, the benzene layer then separated, washed with 18% hydrogen chloride solution in water and then with water, and the polymer separated from the washed layer and further processed as described in Example 1.

In modifications of this example, the identical composition and procedure are followed except that the alkyl alkenyl bromophenol which is used contains methallyl or ethallyl in place of the allyl group as the alkenyl in the starting material above. In a further modification, the methyl groups in the bromophenols used are substituted by ethyl and propyl, used separately and in turn.

The epoxidation of the alkenyl group converts that group to glycidyl.

The epoxidized products made as described are soluble in the organic solvents such as benzene and chlorinated hydrocarbons containing 1–5 carbon atoms, insoluble in water, and thermosetting.

They are more soluble in more polar solvents such as methyl ethyl ketone, which make them more widely useful in certain coating applications. They are capable of reacting with hydroxy-containing compounds and can be cured with amines and polyamines and other agents for epoxy curing compounds. They provide anchor sites with amino silicones that are used as primers for certain applications.

It will be understood that it is intended to cover all changes and modifications of the examples of the invention herein chosen for the purpose of illustration which do not constitute departures from the spirit and scope of the invention.

We claim:
1. A thermosetting resinous substituted polyphenylene oxide polymer containing units of the formula

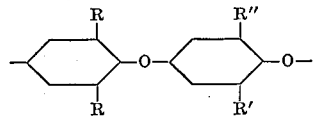

in which R represents any $C_1$–$C_3$ alkyl, R' is a monovalent component selected from the group consisting of $C_3$–$C_5$ alkenyls and $C_3$–$C_5$ epoxidized alkenyls, R'' is selected from the group consisting of R and R', and there being at least one of said $C_3$–$C_5$ epoxidized alkenyl groups in said units.

2. The polymer of claim 1 in which R'' is a methyl.
3. The polymer of claim 1 in which R' is allyl.
4. The polymer of claim 1 in which R and R'' are methyl and R' is allyl.
5. The polymer of claim 1 in which R' is glycidyl.
6. A thermosetting resinous substituted polyphenylene oxide polymer containing units of the formula

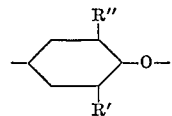

in which R' is $C_3$–$C_5$ epoxidized alkenyl and R'' is $C_1$–$C_3$ alkyl.

7. The polymer of claim 6 in which R' is glycidyl.
8. The polymer of claim 1 in which the proportions of said R groups is 5–95 for 100 total of said R, R' and R''.

References Cited by the Examiner

UNITED STATES PATENTS 3,134,753   5/1964   Kwiatek _____ 260—47

OTHER REFERENCES

Kurian et al.: J. Pol. Sci. 49 pp. 267–275 (1961).
Hay, J.: Poly. Sci. 58 pp. 581–591 (1962).

WILLIAM H. SHORT, *Primary Examiner.*
TIMOTHY D. KERWIN, *Examiner.*
J. C. MARTIN, *Assistant Examiner.*